United States Patent
Keller et al.

(10) Patent No.: US 12,134,484 B2
(45) Date of Patent: Nov. 5, 2024

(54) SYSTEM AND METHOD FOR CONTEXTUALLY-INFORMED FAULT DIAGNOSTICS USING STRUCTURAL-TEMPORAL ANALYSIS OF FAULT PROPAGATION GRAPHS

(71) Applicant: The Boeing Company, Chicago, IL (US)

(72) Inventors: Jason M. Keller, Des Peres, MO (US); Lee Wang, Okemos, MI (US); James M. Ethington, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 17/710,319

(22) Filed: Mar. 31, 2022

(65) Prior Publication Data

US 2022/0388689 A1 Dec. 8, 2022

Related U.S. Application Data

(60) Provisional application No. 63/195,979, filed on Jun. 2, 2021.

(51) Int. Cl.
*B64F 5/60* (2017.01)
*B64D 45/00* (2006.01)
*G06F 11/07* (2006.01)

(52) U.S. Cl.
CPC ............... *B64F 5/60* (2017.01); *B64D 45/00* (2013.01); *G06F 11/0739* (2013.01); *G06F 11/079* (2013.01)

(58) Field of Classification Search
CPC ....... B64F 5/60; B64D 45/00; G06F 11/0739; G06F 11/079

(Continued)

(56) References Cited

U.S. PATENT DOCUMENTS 11,065,979 B1 * 7/2021 Demont ................... B64F 5/60
11,420,756 B1 * 8/2022 Moy ....................... B64D 27/24
(Continued)

FOREIGN PATENT DOCUMENTS

BR 102019024782 A2 * 6/2020 ............. G06F 11/008
CA 2781029 A1 * 12/2012 ................. B64F 5/40
(Continued)

OTHER PUBLICATIONS

Extended European Search Report in the corresponding European Patent Application No. 22167937.6, mailed Sep. 12, 2022.

*Primary Examiner* — Atul Trivedi
(74) *Attorney, Agent, or Firm* — Quinn IP Law

(57) ABSTRACT

A method is provided for diagnosing a failure on an aircraft that includes aircraft systems and monitors configured to report effects of failure modes of the aircraft systems. The method includes receiving a fault report that indicates one or more of the monitors that reported the effects of a failure mode in an aircraft system of the aircraft systems, and accessing a fault pattern library that describes relationships between possible failure modes and patterns of those of the monitors configured to report the effects of the possible failure modes. The method also includes diagnosing the failure mode of the aircraft system from the one or more of the monitors that reported, and using the fault pattern library and a greedy selection algorithm, determining a maintenance action for the failure mode; and generating a maintenance message including at least the maintenance action.

20 Claims, 11 Drawing Sheets

(58) Field of Classification Search
USPC ........................................................ 701/29.1
See application file for complete search history.

(56) References Cited

U.S. PATENT DOCUMENTS

| | | | | |
|---|---|---|---|---|
| 11,598,880 | B2* | 3/2023 | Lu | ...................... G05B 23/024 |
| 2009/0037772 | A1 | 2/2009 | Wegerich et al. | |
| 2010/0100259 | A1* | 4/2010 | Geiter | .................... G06N 5/045 |
| | | | | 701/29.5 |
| 2011/0276832 | A1 | 11/2011 | Schneider et al. | |
| 2012/0078921 | A1* | 3/2012 | Lebeau | ............... G06F 11/0739 |
| | | | | 707/E17.044 |
| 2012/0330499 | A1 | 12/2012 | Scheid et al. | |
| 2015/0236546 | A1* | 8/2015 | Kesler | ...................... H04B 5/26 |
| | | | | 455/573 |
| 2015/0255994 | A1* | 9/2015 | Kesler | ................... B60L 53/124 |
| | | | | 307/10.1 |
| 2015/0274315 | A1* | 10/2015 | Conrad | ................. B64D 45/00 |
| | | | | 701/31.9 |
| 2015/0287422 | A1* | 10/2015 | Short | ........................ G01S 3/74 |
| | | | | 704/211 |
| 2016/0096633 | A1* | 4/2016 | Guibert | ............. G05B 23/0278 |
| | | | | 701/31.8 |
| 2016/0257421 | A1* | 9/2016 | Ye | ............................. B64D 3/00 |
| 2017/0233104 | A1* | 8/2017 | Bolling | ..................... B64F 5/60 |
| | | | | 701/2 |
| 2018/0204111 | A1* | 7/2018 | Zadeh | .................. G06V 10/764 |
| 2019/0065637 | A1* | 2/2019 | Bogdoll | ................. G06N 20/00 |
| 2019/0065933 | A1* | 2/2019 | Bogdoll | ................. G06N 3/08 |
| 2019/0147670 | A1* | 5/2019 | Chopra | ............... G07C 5/0808 |
| | | | | 701/29.1 |
| 2019/0228594 | A1* | 7/2019 | Nakhkoob Niasar | .. B64D 45/00 |
| 2020/0116492 | A1* | 4/2020 | Scott | ....................... G06F 16/29 |
| 2020/0118366 | A1* | 4/2020 | Ryan | ..................... G07C 5/0816 |
| 2020/0168104 | A1* | 5/2020 | Holder | ................. G08G 5/0039 |
| 2020/0180789 | A1* | 6/2020 | Li | .............................. B64F 5/60 |
| 2020/0183423 | A1* | 6/2020 | Li | ......................... G01P 21/025 |
| 2020/0183424 | A1* | 6/2020 | Li | .............................. B64F 5/60 |
| 2020/0184278 | A1* | 6/2020 | Zadeh | .................... G06N 3/044 |
| 2020/0348697 | A1* | 11/2020 | Kuhara | .................. B64C 13/18 |
| 2020/0391881 | A1* | 12/2020 | Elshrif | ................... G06N 20/00 |
| 2021/0073995 | A1* | 3/2021 | Yang | ..................... G06N 3/045 |
| 2021/0171221 | A1* | 6/2021 | Wilmering | ........... G06F 11/0784 |
| 2021/0174612 | A1* | 6/2021 | Wilmering | ............. G06F 30/27 |

FOREIGN PATENT DOCUMENTS

| | | | | | |
|---|---|---|---|---|---|
| CA | 2808829 | A1 | * | 9/2013 | ............ B64D 45/00 |
| CN | 106687996 | A | * | 5/2017 | ............ B64D 45/00 |
| CN | 106687996 | B | * | 8/2021 | ............ B64D 45/00 |
| EP | 3284668 | A1 | * | 2/2018 | ........... B64C 27/006 |
| EP | 3284669 | A1 | * | 2/2018 | ........... B64C 27/006 |
| EP | 3284670 | A1 | * | 2/2018 | ............ B64D 45/00 |
| FR | 3026882 | A1 | * | 4/2016 | ............ B64D 45/00 |
| FR | 3047103 | A1 | * | 7/2017 | ......... G06K 9/00335 |
| FR | 3072475 | B1 | * | 11/2019 | ............ B64D 45/00 |
| FR | 3087755 | A1 | * | 5/2020 | ............ B64D 29/08 |
| GB | 2546253 | A | * | 7/2017 | ............ B64D 45/00 |
| WO | WO-2015107317 | A1 | * | 7/2015 | ............ B64D 45/00 |
| WO | WO-2015157458 | A1 | * | 10/2015 | ............. G01S 13/723 |
| WO | WO-2020044134 | A1 | * | 3/2020 | ............. B60L 15/007 |
| WO | WO-2021130520 | A1 | * | 7/2021 | ............ B64D 45/00 |

* cited by examiner

SYSTEM AND METHOD FOR CONTEXTUALLY-INFORMED FAULT DIAGNOSTICS USING STRUCTURAL-TEMPORAL ANALYSIS OF FAULT PROPAGATION GRAPHS

CROSS-REFERENCE TO RELATED APPLICATION(S)

This application claims priority to and the benefit of U.S. Provisional Patent Application No. 63/195,979, filed Jun. 2, 2021, entitled System and Method for Contextually-Informed Fault Diagnostics Using Structural-Temporal Analysis of Fault Propagation Graphs, the content of which is incorporated herein by reference in its entirety.

TECHNOLOGICAL FIELD

The present disclosure relates generally to aircraft maintenance and, in particular, to contextually-informed fault diagnostics using structural-temporal analysis of fault propagation graphs.

BACKGROUND

Given a set of observable signals of failure and a fault propagation model, there can be many probable causes of failure given fault pattern overlap and other sources of innate ambiguity in the engineering model. This innate ambiguity results in higher cost due and longer aircraft-on-ground downtime as multiple maintenance tasks must be performed in order to test, isolate and remove/repair or replace the failed component. Additionally, when multiple potential root causes are identified, there is typically no specified order for which these root causes should be examined. This often leads to unnecessary maintenance checks to rule out failures that may have a low probability of being a root cause.

Throughout the fault isolation process, maintenance operational context is often kept in the head of the maintainer as tribal knowledge, which may result in inconsistent performance of maintenance activities such as unnecessary checks, poor identification of false positives, etc.

Therefore, it would be desirable to have a system and method that takes into account at least some of the issues discussed above, as well as other possible issues.

BRIEF SUMMARY

Example implementations of the present disclosure are directed to improved techniques for diagnosis and correlation of failure data to maintenance actions, and contextually-informed fault diagnostics using structural-temporal analysis of fault propagation graphs. Example implementations provide a computer including a reasoner and a process for diagnosing a failure on an aircraft.

The present disclosure thus includes, without limitation, the following example implementations.

Some example implementations provide a method of diagnosing a failure on an aircraft that includes aircraft systems and monitors configured to report effects of failure modes of the aircraft systems, the method comprising: receiving a fault report that indicates one or more of the monitors that reported the effects of a failure mode in an aircraft system of the aircraft systems; accessing a fault pattern library that describes relationships between possible failure modes and patterns of those of the monitors configured to report the effects of the possible failure modes; diagnosing the failure mode of the aircraft system from the one or more of the monitors that reported, and using the fault pattern library and a greedy selection algorithm; determining a maintenance action for the failure mode; and generating a maintenance message including at least the maintenance action.

In some example implementations of the method of any preceding example implementation, or any combination of any preceding example implementations, the method further comprises: performing a failure mode effect analysis (FMEA) from which a fault propagation model is constructed to describe causal relationships between failure modes and failure effects, and propagation of the failure effects to monitors configured to report observable ones of the failure effects; and building the fault pattern library from the fault propagation model.

In some example implementations of the method of any preceding example implementation, or any combination of any preceding example implementations, building the fault pattern library comprises performing an analysis of the fault propagation model to build the fault pattern library that identifies the failure modes and patterns of those of the monitors that reported responsive to the failure modes.

In some example implementations of the method of any preceding example implementation, or any combination of any preceding example implementations, the analysis of the fault propagation model includes a structural-temporal analysis, and the fault pattern library further identifies any temporal sequence between multiple ones of the monitors that reported for any of the failure modes.

In some example implementations of the method of any preceding example implementation, or any combination of any preceding example implementations, the fault pattern library identifies any groups of the failure modes for which a pattern of those of the monitors that reported is the same.

In some example implementations of the method of any preceding example implementation, or any combination of any preceding example implementations, the fault pattern library further identifies any temporal sequence between multiple ones of the monitors that reported for any of the failure modes.

In some example implementations of the method of any preceding example implementation, or any combination of any preceding example implementations, upon receipt of one or more of the monitors that reported, diagnosing the failure mode using the greedy selection algorithm includes matching patterns of the one or more of the monitors that reported to patterns in the fault pattern library, the greedy selection algorithm performing the steps of: selecting groups of patterns that minimize the number of total failed aircraft components; selecting groups of patterns that appear earlier in the temporal sequence; and selecting groups of patterns that have a highest calculated temporal score indicating an accuracy of the patterns of the one or more of the monitors that reported compared to the patterns of those of the monitors configured to report, and wherein the temporal score is inversely proportional to a distance between an observed position and an expected position of the one or more of the monitors that reported an earlier failure effect in the pattern of the one or more of the monitors that reported, based on the patterns of those of the monitors configured to report.

In some example implementations of the method of any preceding example implementation, or any combination of any preceding example implementations, metrics for a root cause, a secondary symptom, and a spurious symptom are calculated for each of the groups of patterns that contain one or more of the monitors that reported, the method further comprising ranking the monitors based on the metrics including providing an initial ranking for the root cause metric from most likely to least likely.

In some example implementations of the method of any preceding example implementation, or any combination of any preceding example implementations, determining the maintenance action includes applying a contextual rules library describing operator preferences to refine a ranked sequence of maintenance actions, wherein each maintenance action is ordered according its respective probability of resolving the failure mode.

Some example implementations provide an apparatus for diagnosing a failure on an aircraft that includes aircraft systems and monitors configured to report effects of failure modes of the aircraft systems, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for diagnosing a failure on an aircraft that includes aircraft systems and monitors configured to report effects of failure modes of the aircraft systems, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 10A:
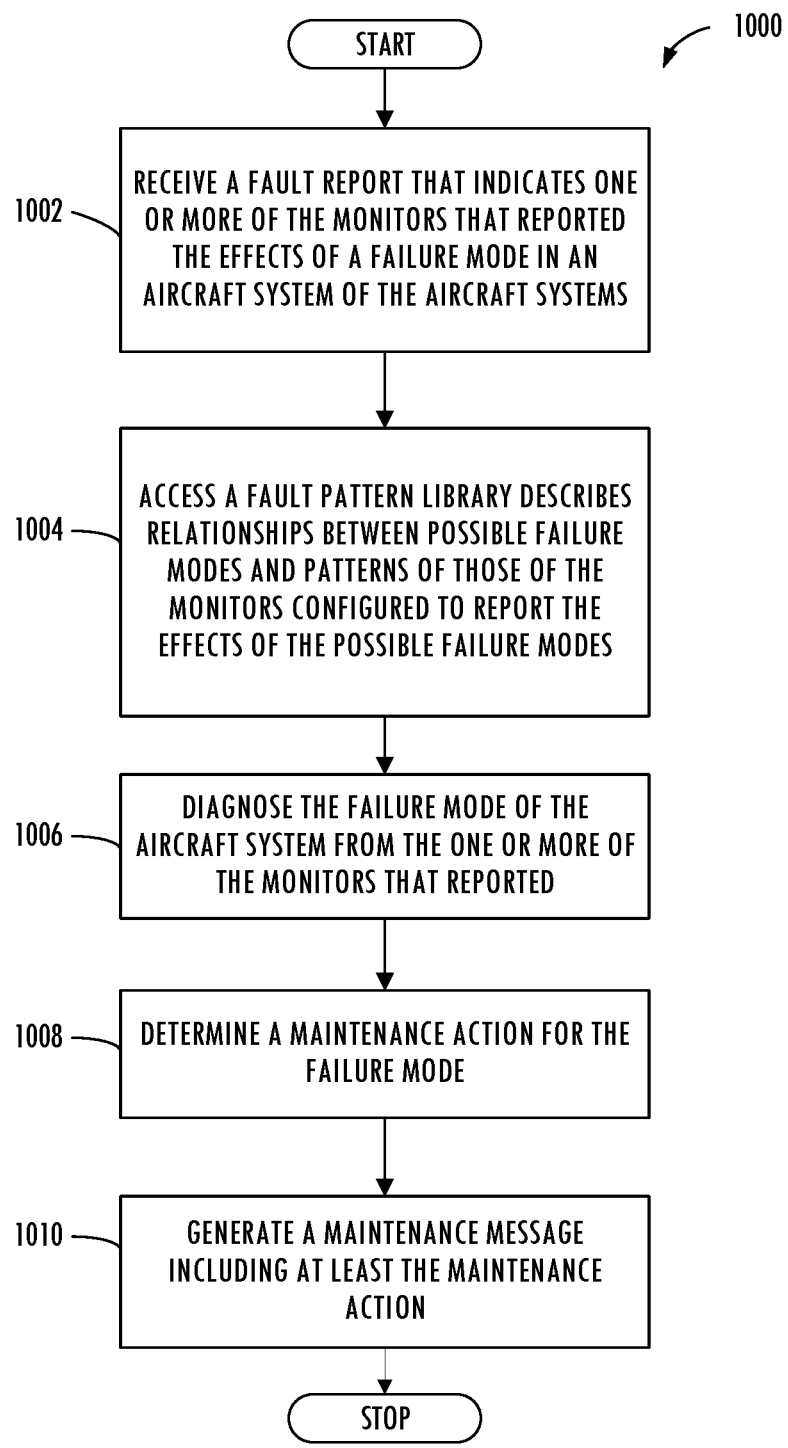
Figure 10B:
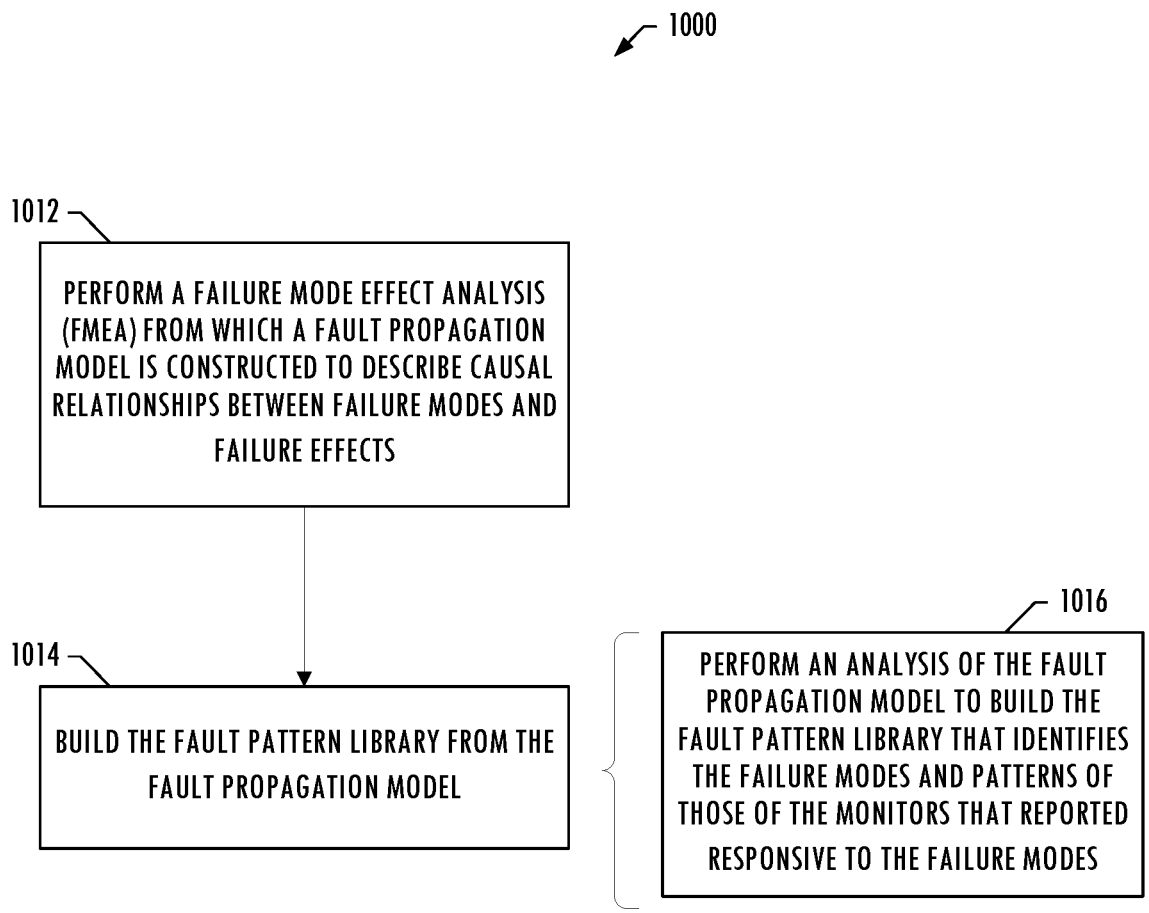
Figure 10C:
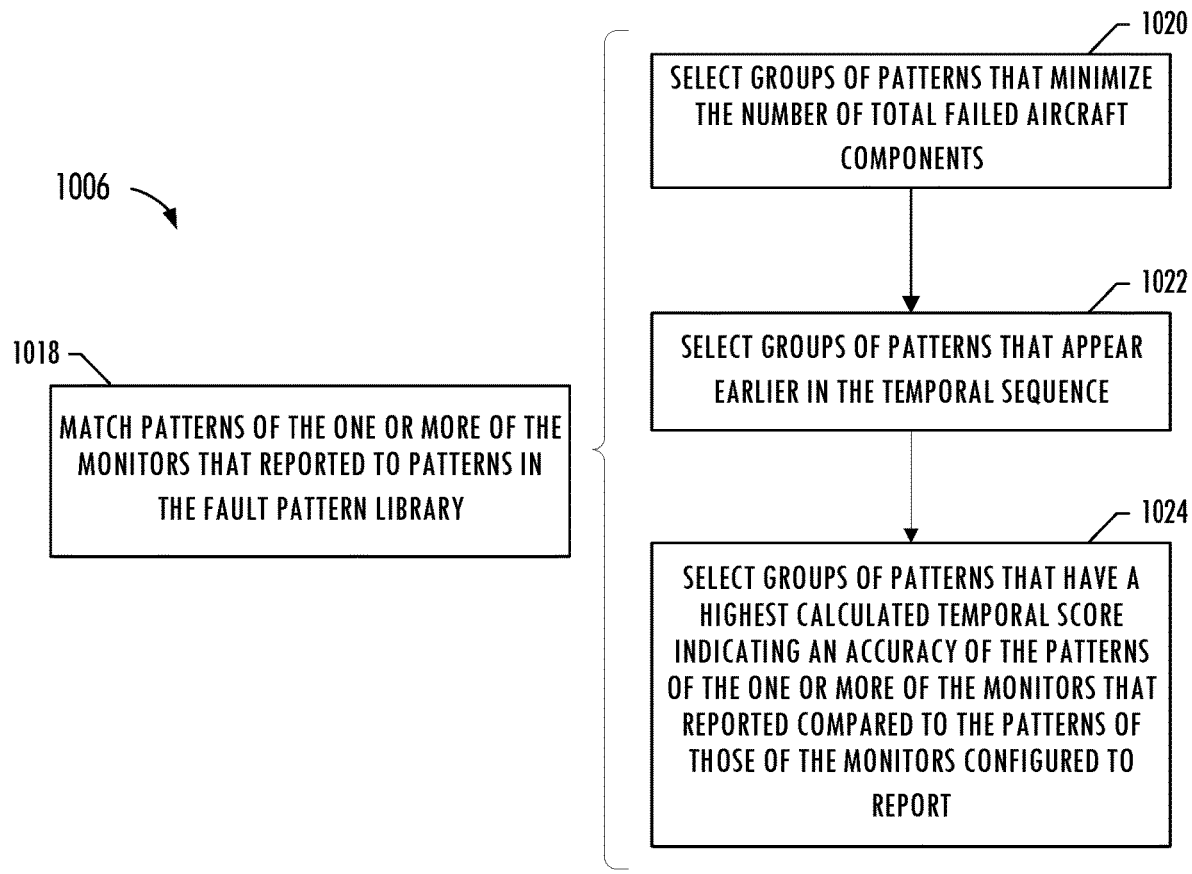
Figure 10D:
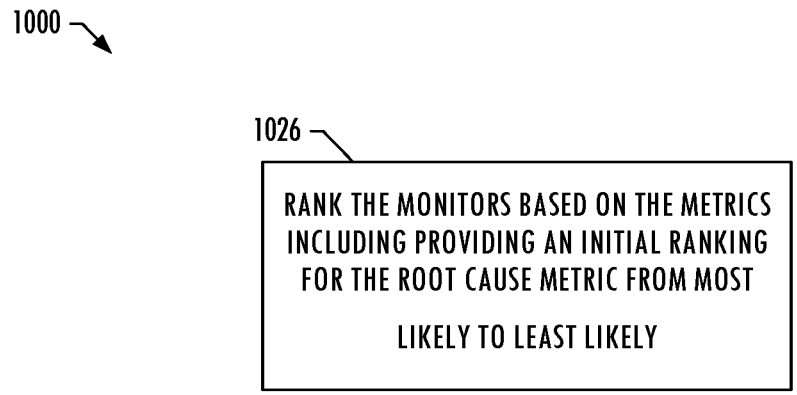
Figure 10E:
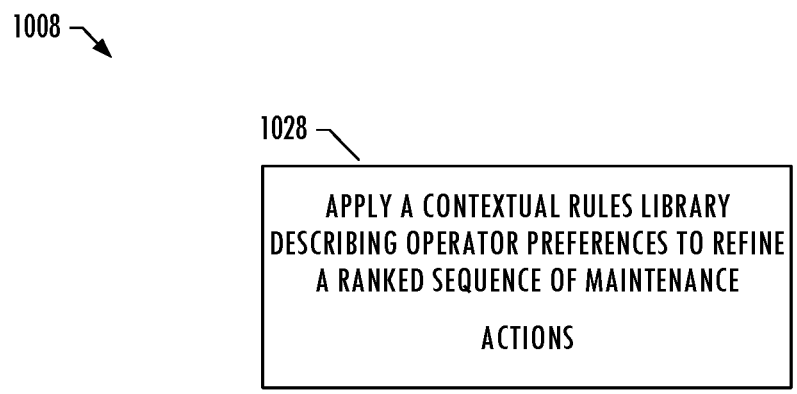
Figure 11:
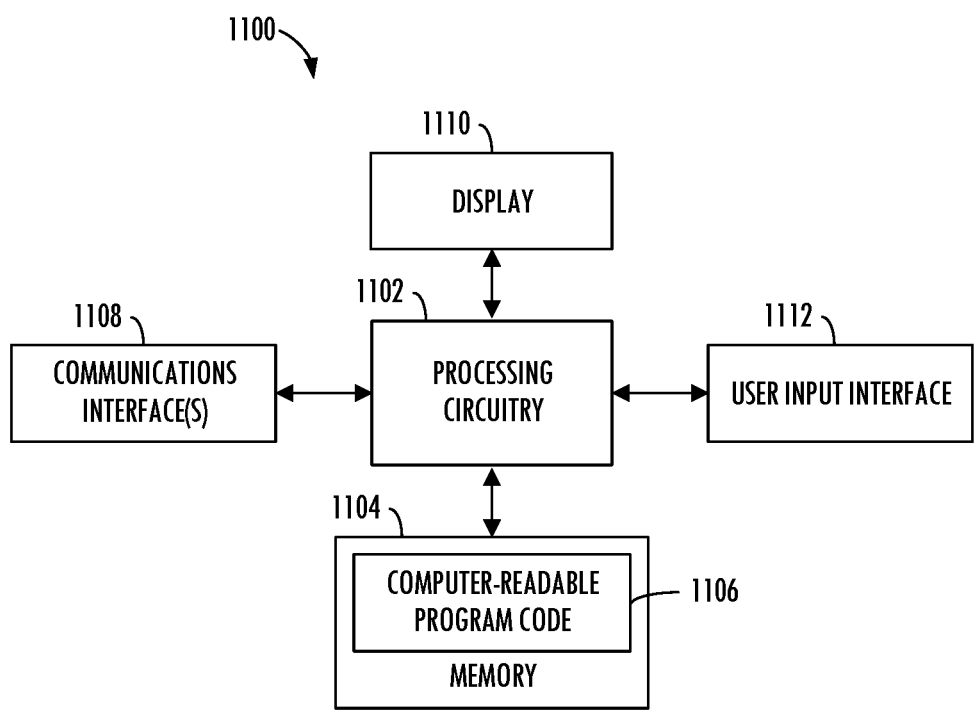

FIGS. 10A, 10B, 10C, 10D, and 10E are flowcharts illustrating various steps in a method for diagnosing a failure on an aircraft, according to example implementations; and FIG. 11 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]"

is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to improved techniques for diagnosis and correlation of failure data to maintenance actions, and contextually-informed fault diagnostics using structural-temporal analysis of fault propagation graphs. Example implementations provide a computer either onboard or offboard an aircraft and including a reasoner, a process for diagnosing a failure on the aircraft by the computer.

Figure 1:
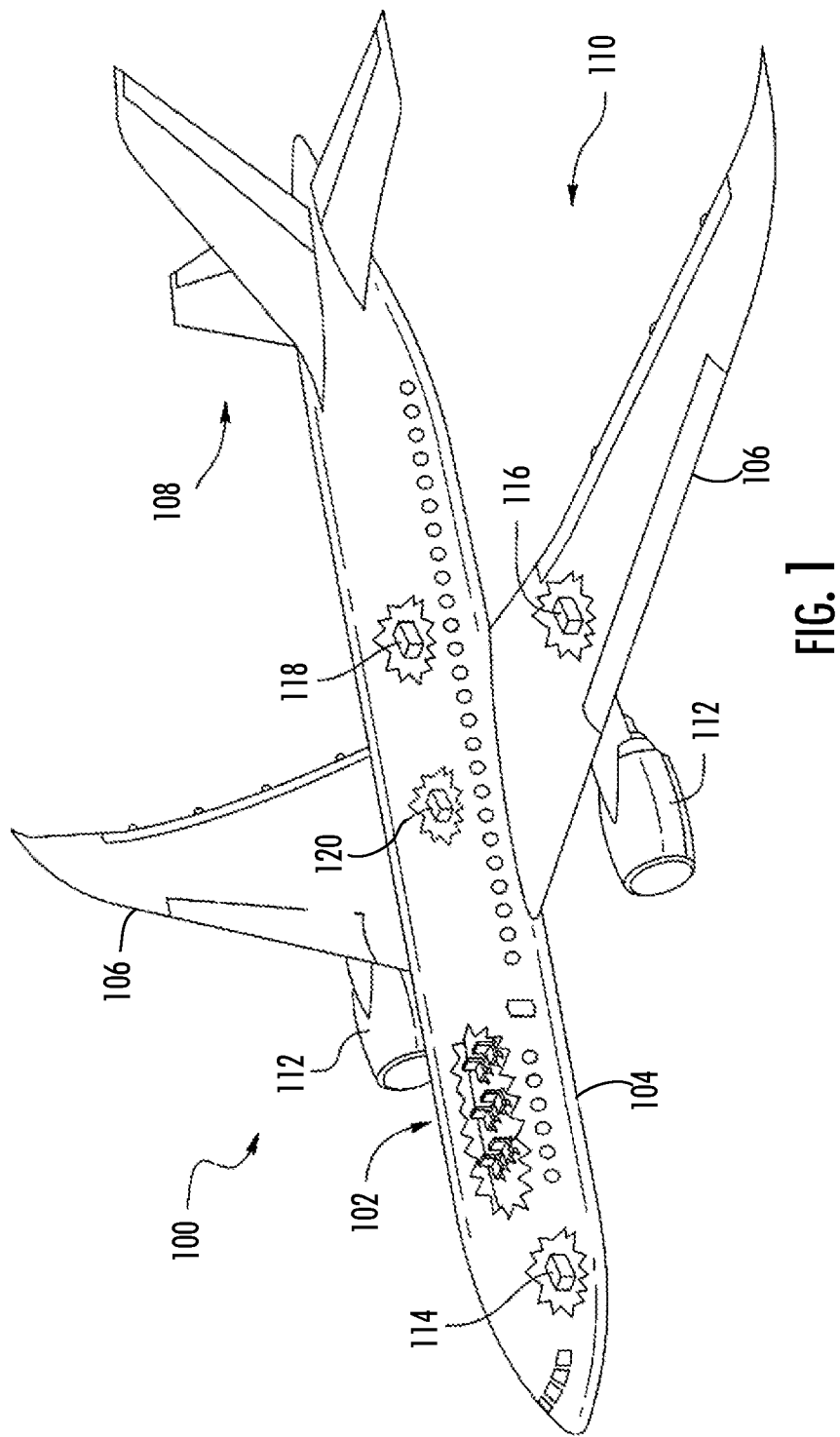
FIG. 1 illustrates an aircraft according to some example implementations of the present disclosure.

FIG. 1 illustrates one type of aircraft 100 that may benefit from example implementations of the present disclosure. Although, the systems and methods described herein may be implemented in other environments or on other machinery. As shown, the aircraft includes an airframe 102 with a fuselage 104, wings 106 and tail 108. The airframe or portions thereof, such as moveable ailerons, spoilers, or flaps on wings 106, may be referred to as an aircraft control surface, according to example implementations of the present disclosure. The aircraft also includes a plurality of high-level systems 110 such as a propulsion system. In the particular example shown in FIG. 1, the propulsion system includes two wing-mounted engines 112. In other examples, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

The high-level systems described above may include a plurality of sensors and subsystems providing fault and sensor data that is communicated via an aircraft data communications bus network and/or an onboard network system (ONS) to an aircraft condition monitoring system (ACMS). The ACMS may collect, monitor, record and report real-time aircraft system data, which may include error messages from a flight deck effects (FDE) system, system test reports, fault reports and other information. The data collected by the ACMS is used, for example, to perform cabin pressure and temperature monitoring, hard landing detection, flight crew monitoring, and engine monitoring in addition to many other aircraft performance functions. The received data is then utilized to analyze aircraft performance, record significant flight events, report aircraft system test reports and fault reports, and troubleshoot faults.

The ACMS may be in communication with an onboard component/computer 120 which may also be referred to as a central maintenance computer (CMC), on which may reside an aircraft health management or maintenance management system and a diagnostic maintenance computing function (DMCF). The onboard computer 120 including the DMCF may receive aircraft system test reports and fault reports, and may further include an onboard diagnostic model. The DMCF may provide data acquisition for the onboard diagnostic model, which receives the test reports and fault report data.

Figure 2:
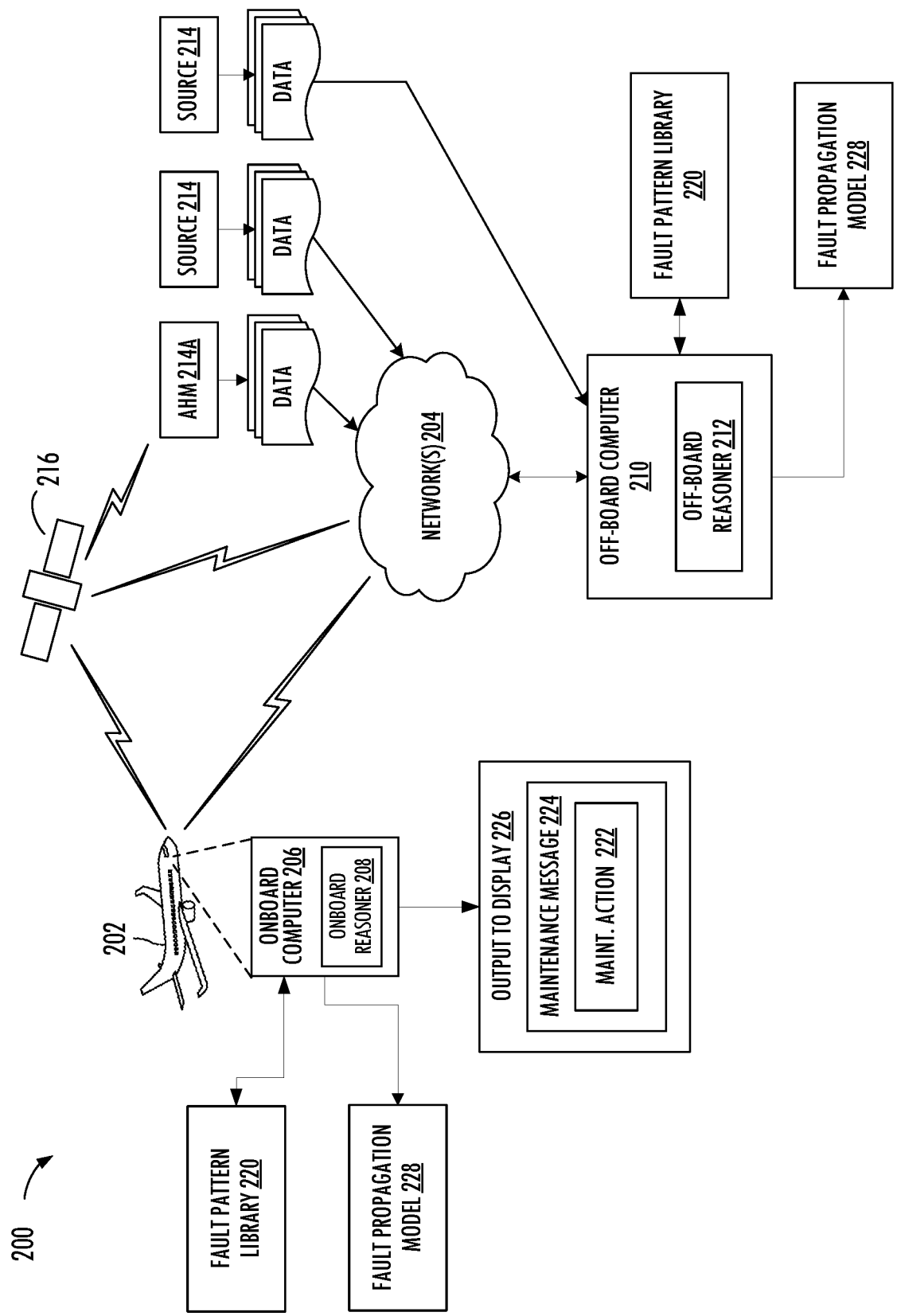
FIG. 2 illustrates a system for diagnosing a failure on an aircraft, according to example implementations of the present disclosure.

FIG. 2 illustrates a system 200 for diagnosing a failure on an aircraft 202 that may correspond to aircraft 100, according to example implementations. As described in greater detail below, the system may include any of a number of different subsystems (each an individual system) for performing one or more functions or operations. The subsystems may be co-located or directly coupled to one another, or in some examples, various ones of the subsystems may communicate with one another across the one or more computer networks 204. Further, although shown as part of the system, it should be understood that any one or more of the subsystems may function or operate as a separate system without regard to any of the other subsystems. It should also be understood that the system may include one or more additional or alternative subsystems than those shown in FIG. 2.

As shown, in some examples, the system 200 includes an onboard computer 206 that may correspond to onboard component/computer 120 of the aircraft 100. The onboard computer includes an onboard reasoner 208, and is configured to diagnose a failure on the aircraft 202 that includes aircraft systems configured to report faults to the onboard reasoner. At least when the aircraft 202 corresponds to aircraft 100, examples of suitable aircraft systems include propulsion system 112, electrical system 114, hydraulic system 116 and/or environmental system 118. Any number of other systems may be included.

Although further discussion of diagnosing a failure on the aircraft 202 may refer to onboard computer 206, it should be understood that the diagnosing of a failure may be performed onboard or offboard the aircraft. In some examples, an offboard computer 210 including an offboard reasoner 212 may perform the diagnosis in substantially the same manner as the onboard computer. And reference may be made to either the onboard computer or the offboard computer in the present disclosure as performing or being configured to perform the diagnosis as part of system 200.

As shown, in some examples, the system 200 includes at least one source 214 of data. In some examples, the source includes a memory that may be located at a single source or distributed across multiple sources. The data may be stored in a number of different manners, such as in a database or flat files of any of a number of different types or formats. In some of these examples, the ACMS onboard the aircraft 202 may collect, monitor, record, and report diagnostic data. At least some of the diagnostic data may be accessible from reports generated by the ACMS and may be wirelessly transmitted to a particular source of data—shown and at times referred to as an airplane health management (AHM) system 214A—directly or via an artificial satellite 216 or network(s) 204. In other of these examples, the diagnostic data may be transmitted via a wired connection or portable data storage device (e.g., flash memory, thumb drive).

According to example implementations of the present disclosure, the onboard computer 206 is configured to receive a fault report that indicates one or more of the monitors that reported the effects of a failure mode in an aircraft system of the aircraft systems. The onboard computer may be configured to access a fault pattern library 220 that describes relationships between possible failure modes and patterns of those of the monitors configured to report the effects of the possible failure modes. The onboard computer may also be configured to diagnose the failure mode of the aircraft system from the one or more of the monitors that reported, and use the fault pattern library and a greedy selection algorithm. The onboard computer may also be configured to determine a maintenance action 222 for the failure mode, and generate a maintenance message 224, output to a display 226, including at least the maintenance action.

In some examples, a failure mode effect analysis (FMEA) is performed, and based on information gathered from the FMEA, a fault propagation model 228 is constructed to describe causal relationships between failure modes and failure effects. In these examples, propagation of the failure effects to monitors is configured to report observable ones of the failure effects. The onboard computer 206 is configured to build the fault pattern library 220 from the fault propagation model.

Figure 3:
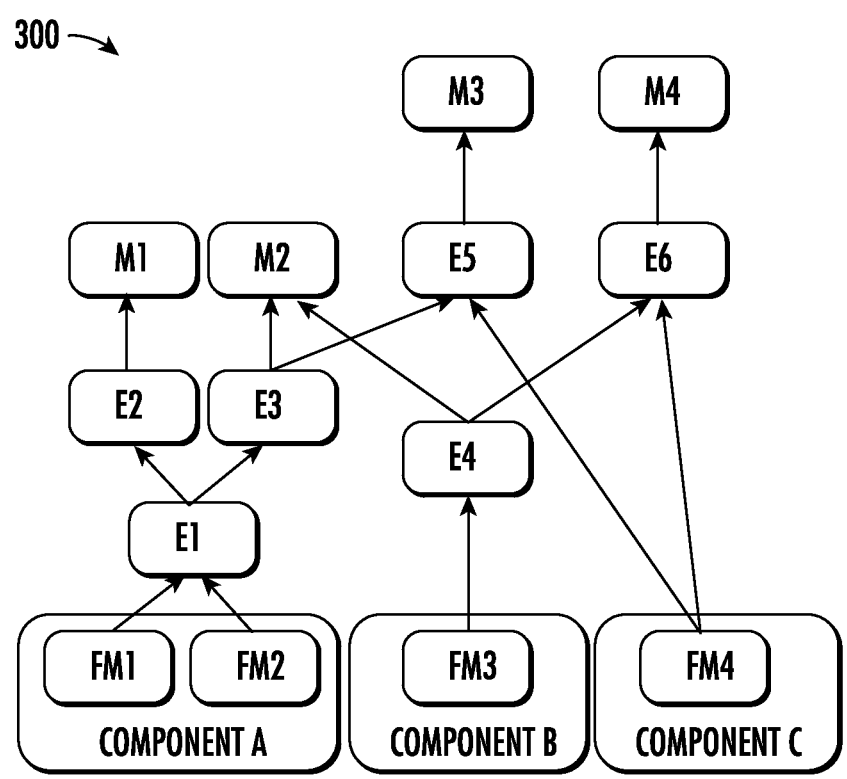
FIG. 3 illustrates a graph of fault propagation showing failure modes linked to aircraft monitors through failure effects, according to example implementations of the present disclosure.

In some examples, as shown in FIG. 3, a fault propagation graph 300, which uses the FMEA and the fault propagation model 228 as input, may describe how the effects of the failure modes propagate through the system 200. Functional effects E1-E6 may be described as the loss of functionality due to component failure modes F1-FM4 and can be categorized as either observable or non-observable. Reference to an observed or observable monitor is synonymous to language describing a monitor(s) that reported. Graph 300 shows monitors M1-M4 that contain programmatic logic designed to detect and report the effect of interest may be created for observable effects.

During the fault propagation analysis phase, it may be the case that expected timing information for an effect to occur (e.g., a rise in temperature will occur between 5-10 ms after the failure of a valve within the coolant system) cannot be determined due to constraints related to lack of engineering data, lack of test data, and lack of time or budget. However, it may still be possible to algorithmically analyze the structure of the graph to build a loosely ordered sequence of monitors, based on the following rules: it may be assumed that the propagation time is a non-zero minimal value for each functional effect node (E1-E6) in the graph 300; and the time to detect an off-nominal scenario and generate a monitor is also effectively zero, that built-in test monitors are detected and generated immediately upon realization of the functional effect.

Returning to FIG. 2, in some examples, the onboard computer 206 configured to build the fault pattern library 220 comprises the onboard computer configured to perform an analysis of the fault propagation model 228 to build the fault pattern library that identifies the failure modes and patterns of those of the monitors that reported responsive to the failure modes. In these examples, the analysis of the fault propagation model includes a structural-temporal analysis, and the fault pattern library further identifies any temporal sequence between multiple ones of the monitors that reported for any of the failure modes. Additionally, the fault pattern library may identify any groups of the failure modes for which a pattern of those of the monitors that reported is the same, which may also be referred to as an ambiguity group, and the fault pattern library may further identify any temporal sequence between multiple ones of the monitors that reported for any of the failure modes.

Figure 4:
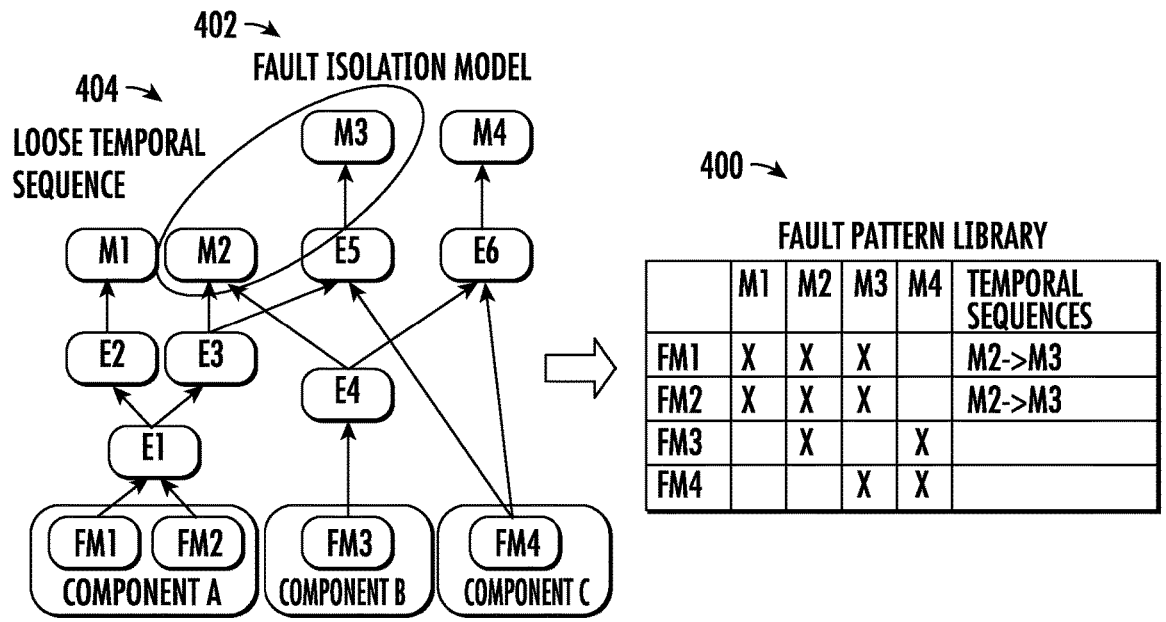
FIG. 4 illustrates a fault pattern library developed from a fault isolation model including loose temporal sequence, according to example implementations of the present disclosure.

As shown in FIG. 4, a fault pattern library 400, which may correspond to the fault pattern library 220, may be created from a fault isolation model 402 that incorporates a loose temporal ordering 404 (represented as sets of sequential pairs) and may be based on the graph 300. This ordering may be used to help disambiguate between false positives and true failures and between failure modes with common symptoms differentiated only by monitor ordering. To build the fault pattern library, for each failure mode, a depth first traversal of the graph is performed and pair wise sequences of monitors are generated for sequential, non-forking paths from one effect to another.

Figure 5:
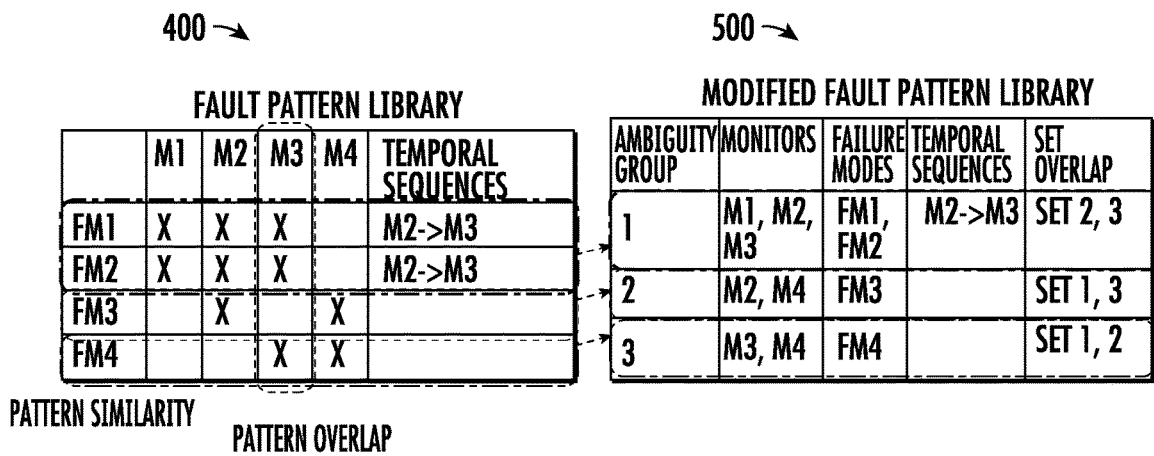
FIG. 5 illustrates a modified fault pattern library developed from the fault pattern library, according to example implementations of the present disclosure.

The fault pattern library 400 can then be modified and refined by first analyzing matrix entries horizontally to construct sets of failure modes that are indistinguishable from each other due to common patterns of monitors, these sets may be referred to as a groups of patterns or ambiguity groups. Additionally, the fault pattern library may be analyzed along the vertical axis to identify set overlap between ambiguity groups, recoding ambiguity groups that share sets of monitors, as shown in FIG. 5. The result of this analysis may include a modified fault pattern library 500 that can be used as the input to diagnosis when faults occur on the aircraft 202.

Figure 6:
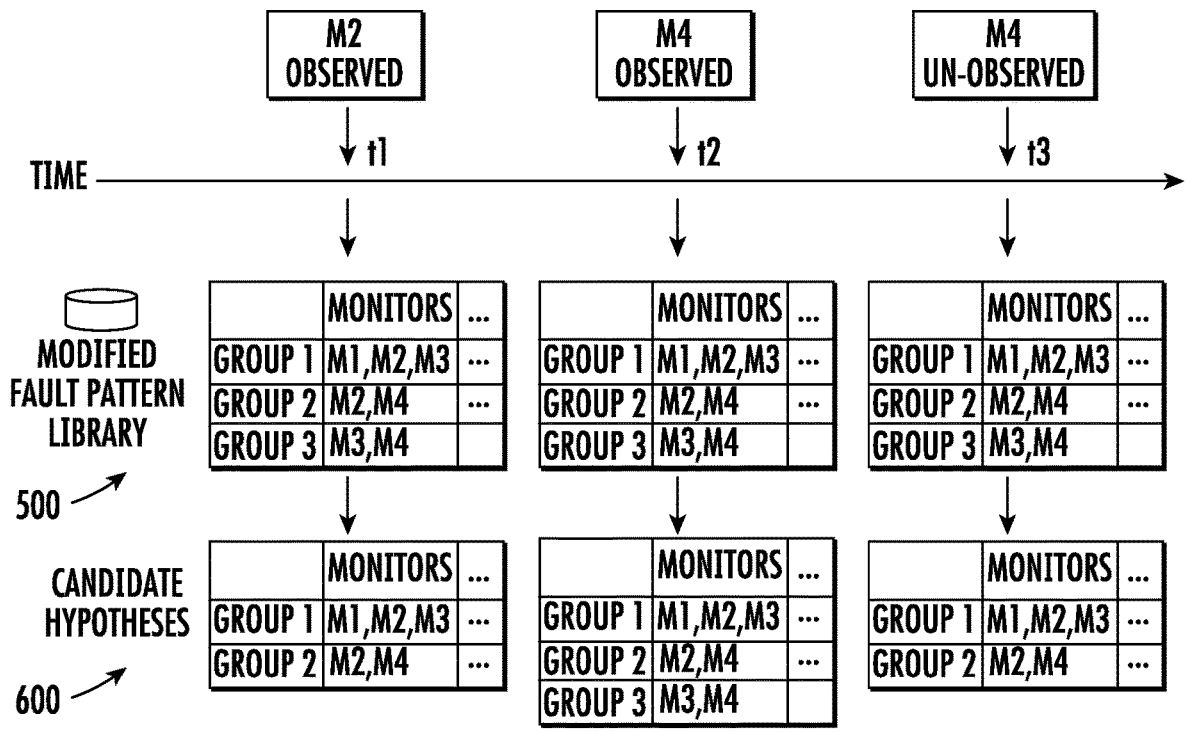
FIG. 6 illustrates sets of candidate hypotheses developed from comparing patterns received from monitors with the modified fault pattern library, according to example implementations of the present disclosure.

The modified fault pattern library 500 may then be deployed either on-board the aircraft 202 via onboard computer 206, or off-board the aircraft integrated into a post-flight maintenance analysis tool of the offboard computer 210 in order to perform fault diagnostics when monitors are triggered. In either deployment scenario, fault diagnostics may be performed in a streaming fashion. As shown in FIG. 6, at each time step t, the diagnostic process may form a set of hypotheses to failure based on the set of new and prior observed evidence (which corresponds to the monitors M1 to Mi). A set of hypotheses (represented as ambiguity groups) may be generated by comparing the pattern of received evidence to matching patterns in the fault pattern library 500, as shown in FIG. 6. This may generate a set of candidate hypotheses 600 for use in the next step.

Figure 7:
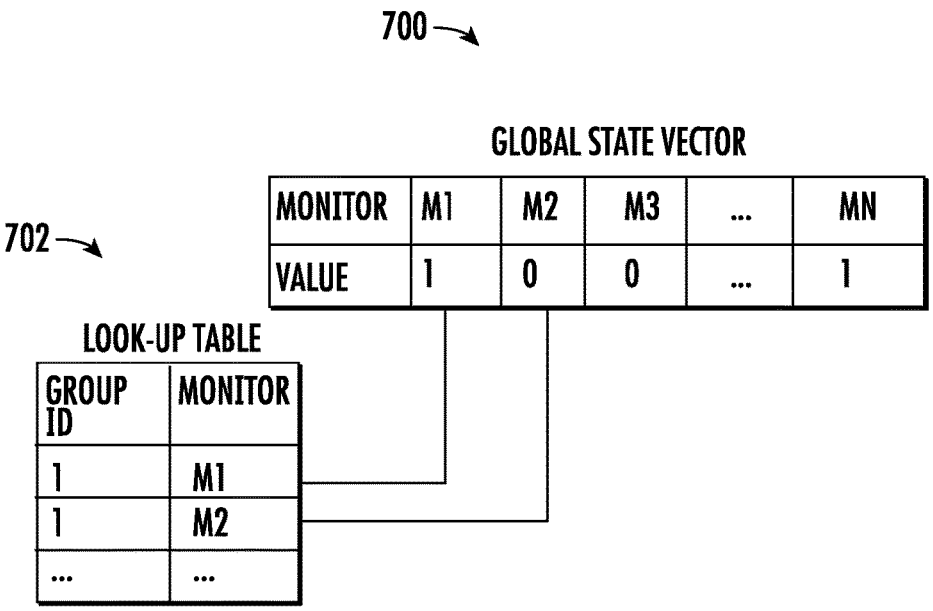
FIG. 7 illustrates global state vectors and a lookup table used to update the marking of an ambiguity group as a candidate hypothesis, according to example implementations of the present disclosure.

In these examples, the monitors may be represented as Boolean values where "true" represents that the conditions that triggered the monitor have been detected. As shown in FIG. 7, monitors may transition between true and false states (observed conditions may be intermittent or periodic) and at each step in time, and the pattern comparison operation may update the list of candidate hypotheses based on the global state 700 of all monitors under consideration.

In some examples, the pattern matching process used to match patterns in the library and generate candidate hypotheses may include, upon receipt of new data, comparing the global state vector 700 with the current observed state vector to generate a list of monitors whose values have changed. Then, for each ambiguity group linked to a monitor that has changed in the look up table 702, the total number of observed monitors may be calculated. If the total number of observed monitors is greater than zero for the ambiguity group, then the ambiguity group may be marked as a candidate hypothesis. If the ambiguity group has been marked as a candidate hypothesis and the number of observed monitors is zero, then the ambiguity group may be unmarked.

In some examples, upon receipt of one or more of the monitors that reported, the onboard computer 206 is configured to use the greedy selection algorithm to diagnose the failure mode by being configured to match patterns of the one or more of the monitors that reported to patterns in the fault pattern library 220, 400. This may include being configured to select groups of patterns that minimize the number of total failed aircraft components, select groups of patterns that appear earlier in the temporal sequence, and select groups of patterns that have a highest calculated temporal score.

More specifically, the greedy selection algorithm may involve balancing the principle of parsimony against domain specific knowledge of how faults typically occur in aircraft systems, including, but not limited to the pattern of fault arrivals compared with expected arrival patterns and statistical knowledge of component failure rates. The greedy selection process may be initialized by calculating a supporting evidence score for each of the candidate ambiguity groups, and calculating a loose temporal score for each of the candidate ambiguity groups. These scores will be explained in subsequent paragraphs. The process may also include initializing a set that contains the set of all current observed monitors, this may subsequently be referred to as the set of un-explained monitors, and selecting from the list of candidate ambiguity groups may use the following criteria:

(1) Failure modes that were detected earlier in the time sequence and whose observable evidence is in order are more likely to be the root cause of failure. This is accomplished by selecting the ambiguity group from the set of candidates that has the earliest unexplained observed monitor detection time and the highest temporal score;

(2) If the first step results in a tie, then failure modes that are more complete are more likely to be the root cause of failure. This may be accomplished by selecting an ambiguity group from the results of step a with the highest Supporting Evidence metric;

(3) If the second step still results in a tie, then failure modes that have a larger set of observed evidence are more likely to be the root cause of failure. This may be accomplished by selecting an ambiguity group from the results of the second subsequent step with the highest cardinality of observed monitors;

(4) If the third step still results in a tie, then failure modes that occur more often are more likely to be the root cause of failure. This may be accomplished by selecting an ambiguity group from the results of step c containing the failure mode with the highest failure rate; and (5) Metrics for the selected ambiguity groups and other groups may be calculated, as will be further explained in the paragraphs below.

The set of observed monitors from the selected ambiguity group may be removed from the unexplained monitor list. The selected ambiguity group may be removed from the candidate hypothesis list, and the process may return to the beginning of the process. The above process and calculating the metrics may be performed until either the set of un-explained monitors is empty or no more un-explored ambiguity groups from the candidate remain. Or the above process and calculating the metrics may also optionally be repeated holding out selected ambiguity groups from prior runs, incrementing the rank number with each successive recursive iteration. Secondary and subsequent runs produce a set of candidate failure modes that should drive maintenance actions should prior runs not result in resolution.

The previously referred to temporal score may indicate an accuracy of the patterns of the one or more of the monitors that reported compared to the patterns of those of the monitors configured to report. And the temporal score may be inversely proportional to a distance between an observed position and an expected position of the one or more of the monitors that reported an earlier failure effect in the pattern of the one or more of the monitors that reported, based on the patterns of those of the monitors configured to report.

In some examples, metrics for a root cause, a secondary symptom, and a spurious symptom are calculated for each of the groups of patterns that contain one or more of the monitors that reported, the apparatus further caused to rank the monitors based on the metrics including the apparatus caused to provide an initial ranking for the root cause metric from most likely to least likely.

The categorizations for root cause, secondary symptom, and spurious system may relate to the following:

Root Cause—The relative percentage of expected fault monitors that are currently active and unexplained by a higher priority diagnosis, which indicates the degree to which the current hypothesis can be considered to be a root cause of the active fault symptoms;

Secondary Symptom—The relative percentage of expected fault monitors that are currently active but have already been explained by a higher priority diagnosis, which indicates the degree to which the hypothesis can be considered to be a secondary diagnosis; and Spurious Symptom—The relative percentage of expected fault monitors that are currently active, which indicates the degree to which the hypothesis can be considered to most likely be a nuisance indication that is not actionable by maintenance.

The greedy selection process may produce a number of metrics that can be used to identify the root cause along with a few metrics that are used to sort and provide other contextual information. Examples of such metrics include those provided below.

Rank may pertain to whether the ambiguity group was selected as the primary hypothesis to failure or not. Values may range from 1 to 999 depending upon the number of recursive iterations performed as described in the previous section. With one recursive iteration (the default), the reasoner will produce a rank of 1 for selected hypothesis and 999 for unselected;

Supporting Evidence, represented by the equation $$SupportingEvidence(ag) = \frac{ObservedEvidence(ag)}{ExpectedEvidence(ag)} \quad \text{Eq (1)}$$

where ag is a hypothesis to failure (e.g. an ambiguity group), ObservedEvidence(ag) is the number of observed monitors expected by h, and ExpectedEvidence(ag) is the total number of observed and unobserved monitors expected by h.

Root Cause, represented by the equation $$RootCause(ag) = \frac{ObservedSelectedEvidence(ag)}{ExpectedEvidence(ag)} \quad \text{Eq (2)}$$

where ObservedSelectedEvidence(ag) is when an ambiguity group is selected using the set cover algorithm, all of the observed monitors covered by this group are added to this count.

Secondary Symptom, represented by the equation $$SecondarySymptom(ag) = \frac{ObservedAlternateEvidence(ag_s, ag)}{ExpectedEvidence(ag)} \quad \text{Eq (3)}$$

where ObservedAlternateEvidence($ag_s$,ag) is when an ambiguity group is selected, all non-selected ambiguity groups are updated counting the sets of monitors that are "explained away" by the primary symptom. This is the set intersection of the observed evidence for $ag_s$ and ag. If $ag_s$=ag, then ObservedAlternateEvidence=0.

Spurious Symptom, represented by the equation $$SpuriousSymptom(ag)=1-(RootCause(ag)+SecondarySymptom(ag)) \quad \text{Eq (4)}$$

Loose Temporal Ordering—pertains to the calculation of a similarity metric that compares the expected order of evidence to the observed evidence that occurs during a fault scenario. Temporal scoring measures how well the observed monitor sequence corresponds to a hypothesis' expected monitor sequences. A hypothesis' local temporal score for an observed monitor decreases with the number of transpositions required to move the observed monitor to its expected position in the sequence. Loose Temporal Ordering may be represented by the equation $$LocalTemporalScore(h, o) = 1 - \frac{ActualSwaps(h, o)}{MaxSwaps(h, o)} \quad \text{Eq (5)}$$

where h is a hypothesis (e.g. ambiguity group), o is an observed monitor, ActualSwaps(h,o) is the number of swaps required to move o to its expected position, and MaxSwaps (h,o) is the number of swaps required if o were maximally out-of-order.

A hypothesis' aggregate temporal score may be calculated from the swap counts for all of the hypothesis' observed monitors according to the equation $$TemporalScore(h, o) = 1 - \frac{\sum ActualSwaps(h, o)}{\sum MaxSwaps(h, o)} \quad \text{Eq (6)}$$

where if either denominator is zero, then the (local) temporal score is 1, and swap counts are calculated according to a fault propagation subgraph comprised of h and h's expected monitors (i.e., monitor observations outside of h's subgraph do not affect h's temporal score).

Figure 8:
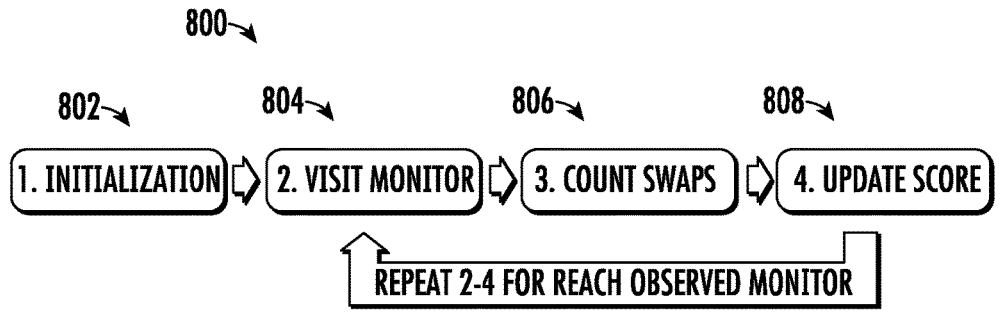
FIG. 8 illustrates a flowchart of an iterative process for calculating a temporal score, according to example implementations of the present disclosure.

As shown in FIG. 8, the temporal score may be calculated via an iterative process 800. First, the temporal state may be initialized at block 802. Then, for each observed monitor, the monitor node may be visited (block 804), its swaps counted (block 806), and the temporal score updated (block 808). Blocks 804 to 808 may be repeated for each monitor that reported.

In some examples, the onboard computer 206 configured to determine the maintenance action includes the being configured to apply a contextual rules library describing operator preferences to refine a ranked sequence of maintenance actions, wherein each maintenance action is ordered according its respective probability of resolving the failure mode.

Figure 9:
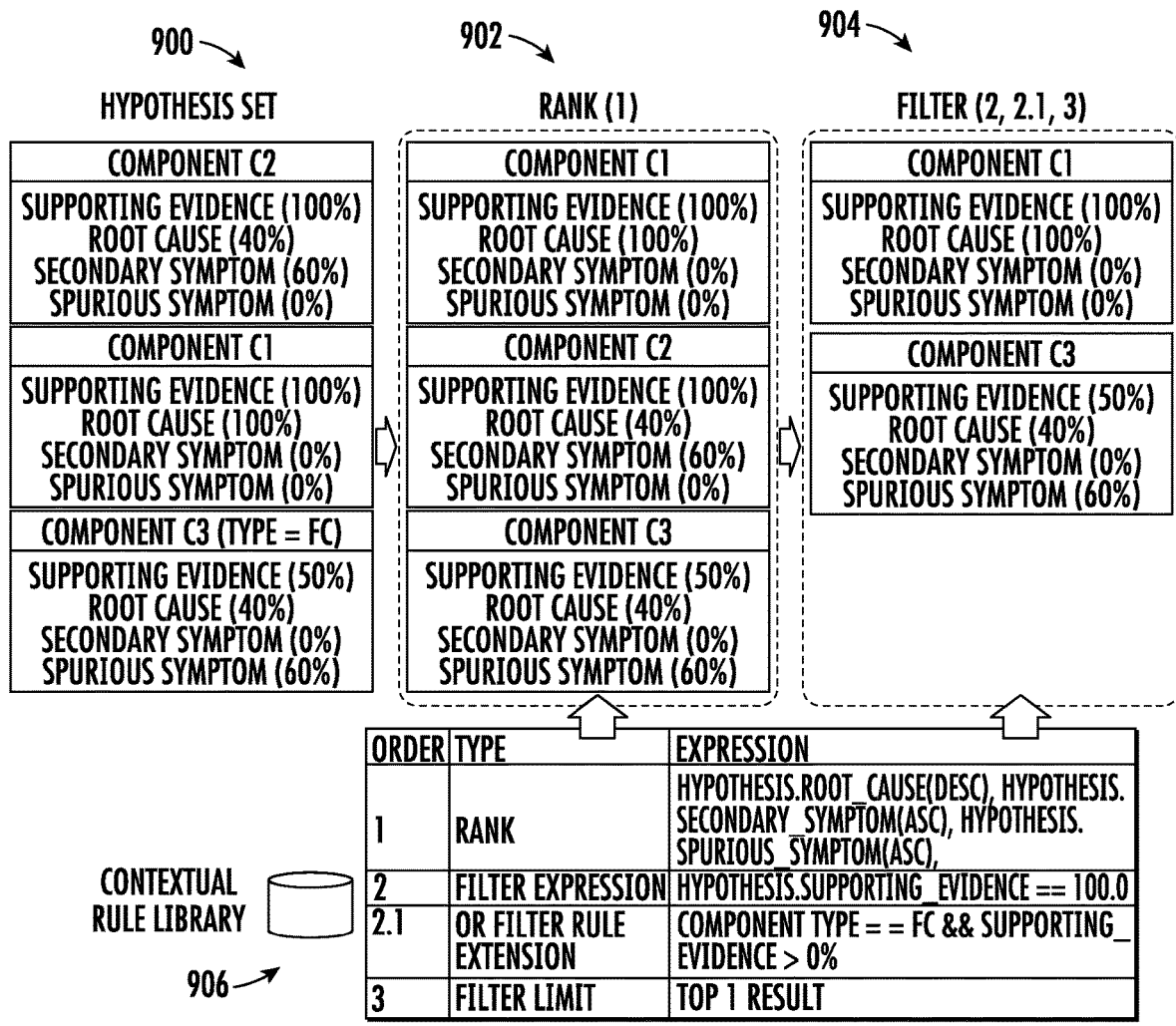
FIG. 9 illustrates utilizing a contextual rules library as part of a process for refining a ranked sequence of maintenance actions, according to example implementations of the present disclosure.

As shown in FIG. 9, once the categorization of a hypothesis to a failure is obtained as a set 900, a ranking 902 and a filtering mechanism 904 may be used to refine a ranked sequence of maintenance actions. The hypotheses may be ranked in the following order by default: ascending ranking, descending root cause, ascending secondary symptom, and ascending spurious symptom. The ranking and filtering mechanisms may leverage the contextual rule library 906, which may be a set of filters, configurable ranking mechanisms, and weights that can be used to modify the default order. The contextual rules library may be used to express contextual preferences that may relate back to an operational maintenance goal. Some examples of this may include:

Always inspect safety critical components even though, for a particular flight, hypothesis containing them may be ranked lower due to the observable evidence, or other factors; and After multiple rounds of fixes, it is seen that component X always appears faulty (though it is not) when component Y fails. The engineering model is ambiguous in this case as distinguishing between the two faults cannot be done because some condition is not observable. For this failure pattern, prefer that component Y be inspected and potentially replaced before moving to component X.

As shown in FIG. 9, the contextual rules library 906 may be represented as an ordered sequence of clauses that are applied to a set of hypotheses 900 to produce a refined result. Clauses may be constructed that perform operations such as:

Ranking—hypotheses can be ranked by the generated metrics by writing a clause that describes the criteria for ordering sequence;

Filtering Expressions—predicates may be constructed that specify conditions that, for each hypothesis, evaluate into true/false values that indicate whether the hypothesis is returned in the final result; and Result Limit—may place a limit on the number of results returned from all of the prior steps.

Application of the contextual rules library 906 may produce an optimized list of maintenance actions in that the most likely root causes of failure are distinguished from spurious and secondary symptoms and the sequence of components returned is ordered in a way that the highest value (in terms of resolution of the fault) is executed first.

FIG. 10A is a flowchart illustrating various steps in a method 1000 of diagnosing a failure on an aircraft 202 that includes aircraft systems and monitors configured to report effects of failure modes of the aircraft systems. As shown at block 1002, the method includes receiving a fault report that indicates one or more of the monitors that reported the effects of a failure mode in an aircraft system of the aircraft systems. As shown at block 1004, the method also includes accessing a fault pattern library 220, 400 that describes relationships between possible failure modes and patterns of those of the monitors configured to report the effects of the possible failure modes.

As shown at block 1006, the method 1000 also includes diagnosing the failure mode of the aircraft system from the one or more of the monitors that reported, which may include using the fault pattern library 220, 400 and a greedy selection algorithm in some example implementations. The method also includes determining a maintenance action 222 for the failure mode, and generating a maintenance message 224 including at least the maintenance action, as shown respectively at blocks 1008 and 1010.

In some examples, the method 1000 further comprises performing a failure mode effect analysis (FMEA) from which a fault propagation model 228 is constructed to describe causal relationships between failure modes and failure effects, as shown at block 1012 in FIG. 10B, and propagation of the failure effects to monitors may be configured to report observable ones of the failure effects. As shown at block 1014, the method also includes building the fault pattern library 220, 400 from the fault propagation model.

In some examples, building the fault pattern library 220, 400 as shown at block 1014 comprises performing an analysis of the fault propagation model 228 to build the fault pattern library that identifies the failure modes and patterns of those of the monitors that reported responsive to the failure modes, as shown at block 1016 in FIG. 10B.

In some examples, upon receipt of one or more of the monitors that reported, diagnosing the failure mode using the greedy selection algorithm, as shown at block 1006, includes matching patterns of the one or more of the monitors that reported to patterns in the fault pattern library 220, 400, as shown at block 1018 in FIG. 10C. This may include the greedy selection algorithm performing the steps of: selecting groups of patterns that minimize the number of total failed aircraft components, as shown at block 1020, and selecting groups of patterns that appear earlier in the temporal sequence, as shown at block 1022. As shown at block 1024, the greedy selection algorithm may also perform the step of selecting groups of patterns that have a highest calculated temporal score indicating an accuracy of the patterns of the one or more of the monitors that reported compared to the patterns of those of the monitors configured to report.

In some examples, metrics for a root cause, a secondary symptom, and a spurious symptom are calculated for each of the groups of patterns that contain one or more of the monitors that reported, and the method 1000 further comprises ranking the monitors based on the metrics including providing an initial ranking for the root cause metric from most likely to least likely, as shown at block 1026 of FIG. 10D.

In some examples, determining the maintenance action as shown at block 1008 includes applying a contextual rules library describing operator preferences to refine a ranked sequence of maintenance actions, as shown at block 1028 of FIG. 10E.

According to example implementations of the present disclosure, the system 200 and its subsystems, including onboard computer 206, may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 11 illustrates an apparatus 1100, which may correspond to computing device 206 of system 200 shown in FIG. 2, according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 1102 (e.g., processor unit) connected to a memory 1104 (e.g., storage device).

The processing circuitry 1102 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1104 (of the same or another apparatus).

The processing circuitry 1102 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processing circuitry 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110, which may correspond to display 226 shown in system 200, and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1100 may include a processing circuitry 1102 and a computer-readable storage medium or memory 1104 coupled to the processing circuitry, where the processing circuitry is configured to execute computer-readable program code 1106 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the subject disclosure includes, without limitation, the following example implementations.

Clause 1. A method of diagnosing a failure on an aircraft that includes aircraft systems and monitors configured to report effects of failure modes of the aircraft systems, the method comprising receiving a fault report that indicates one or more of the monitors that reported the effects of a failure mode in an aircraft system of the aircraft systems; accessing a fault pattern library that describes relationships between possible failure modes and patterns of those of the monitors configured to report the effects of the possible failure modes; diagnosing the failure mode of the aircraft system from the one or more of the monitors that reported, and using the fault pattern library and a greedy selection algorithm; determining a maintenance action for the failure mode; and generating a maintenance message including at least the maintenance action.

Clause 2. The method of Clause 1 further comprising performing a failure mode effect analysis (FMEA) from which a fault propagation model is constructed to describe causal relationships between failure modes and failure effects, and propagation of the failure effects to monitors configured to report observable ones of the failure effects; and building the fault pattern library from the fault propagation model.

Clause 3. The method of Clause 2, wherein building the fault pattern library comprises performing an analysis of the fault propagation model to build the fault pattern library that identifies the failure modes and patterns of those of the monitors that reported responsive to the failure modes.

Clause 4. The method of Clause 3, wherein the analysis of the fault propagation model includes a structural-temporal analysis, and the fault pattern library further identifies any temporal sequence between multiple ones of the monitors that reported for any of the failure modes.

Clause 5. The method of Clause 3 or 4, wherein the fault pattern library identifies any groups of the failure modes for which a pattern of those of the monitors that reported is the same.

Clause 6. The method of Clause 5, wherein the fault pattern library further identifies any temporal sequence between multiple ones of the monitors that reported for any of the failure modes.

Clause 7. The method of any of Clauses 1-6, wherein upon receipt of one or more of the monitors that reported, diagnosing the failure mode using the greedy selection algorithm includes matching patterns of the one or more of the monitors that reported to patterns in the fault pattern library, the greedy selection algorithm performing the steps of selecting groups of patterns that minimize a number of total failed aircraft components; selecting groups of patterns that appear earlier in a temporal sequence; and selecting groups of patterns that have a highest calculated temporal score indicating an accuracy of the patterns of the one or more of the monitors that reported compared to the patterns of those of the monitors configured to report, and wherein the temporal score is inversely proportional to a distance between an observed position (300) and an expected position of the one or more of the monitors that reported an earlier failure effect in the pattern of the one or more of the monitors that reported, based on the patterns of those of the monitors configured to report.

Clause 8. The method of Clause 7, wherein metrics for a root cause, a secondary symptom, and a spurious symptom are calculated for each of the groups of patterns that contain one or more of the monitors that reported, the method further comprising ranking the monitors based on the metrics including providing an initial ranking for the root cause metric from most likely to least likely.

Clause 9. The method of Clause 8, wherein determining the maintenance action includes applying a contextual rules library describing operator preferences to refine a ranked sequence of maintenance actions, wherein each maintenance action is ordered according its respective probability of resolving the failure mode.

Clause 10. An apparatus for diagnosing a failure on an aircraft that includes aircraft systems and monitors configured to report effects of failure modes of the aircraft systems, the apparatus comprising memory configured to store computer-readable program code; and processing circuitry configured to access the memory and execute the program code to cause the apparatus to at least receive a fault report that indicates one or more of the monitors that reported the effects of a failure mode in an aircraft system of the aircraft systems; access a fault pattern library that describes relationships between possible failure modes and patterns of those of the monitors configured to report the effects of the possible failure modes; diagnose the failure mode of the aircraft system from the one or more of the monitors that reported, and use the fault pattern library and a greedy selection algorithm; determine a maintenance action for the failure mode; and generate a maintenance message including at least the maintenance action.

Clause 11. The apparatus of Clause 10, wherein the apparatus is further caused to perform a failure mode effect analysis (FIFA) from which a fault propagation model is constructed to describe causal relationships between failure modes and failure effects, and propagation of the failure effects to monitors configured to report observable ones of the failure effects; and build the fault pattern library from the fault propagation model.

Clause 12. The apparatus of Clause 11, wherein the apparatus caused to build the fault pattern library comprises the apparatus caused to perform an analysis of the fault propagation model to build the fault pattern library that identifies the failure modes and patterns of those of the monitors that reported responsive to the failure modes.

Clause 13. The apparatus of Clause 12, wherein the analysis of the fault propagation model includes a structural-temporal analysis, and the fault pattern library further identifies any temporal sequence between multiple ones of the monitors that reported for any of the failure modes.

Clause 14. The apparatus of Clause 12 or 13, wherein the fault pattern library identifies any groups of the failure modes for which a pattern of those of the monitors that reported is the same.

Clause 15. The apparatus of Clause 14, wherein the fault pattern library further identifies any temporal sequence between multiple ones of the monitors that reported for any of the failure modes.

Clause 16. The apparatus of any of Clauses 10-15, wherein upon receipt of one or more of the monitors that reported, the apparatus is caused to use the greedy selection algorithm to diagnose the failure mode by being caused to match patterns of the one or more of the monitors that reported to patterns in the fault pattern library, wherein the apparatus caused to match the patterns includes being caused to select groups of patterns that minimize a number of total failed aircraft components; select groups of patterns that appear earlier in a temporal sequence; and select groups of patterns that have a highest calculated temporal score indicating an accuracy of the patterns of the one or more of the monitors that reported compared to the patterns of those of the monitors configured to report, and wherein the temporal score is inversely proportional to a distance between an observed position and an expected position of the one or more of the monitors that reported an earlier failure effect in the pattern of the one or more of the monitors that reported, based on the patterns of those of the monitors configured to report.

Clause 17. The apparatus of Clause 16, wherein metrics for a root cause, a secondary symptom, and a spurious symptom are calculated for each of the groups of patterns that contain one or more of the monitors that reported, the apparatus further caused to rank the monitors based on the metrics including the apparatus caused to provide an initial ranking for the root cause metric from most likely to least likely.

Clause 18. The apparatus of Clause 17, wherein the apparatus caused to determine the maintenance action includes the apparatus caused to apply a contextual rules library describing operator preferences to refine a ranked sequence of maintenance actions, wherein each maintenance action is ordered according its respective probability of resolving the failure mode.

Clause 19. A computer-readable storage medium comprising computer—readable program code for diagnosing a failure on an aircraft that includes aircraft systems and monitors configured to report effects of failure modes of the aircraft systems, in response to execution by processing circuitry and thereby causing an apparatus to at least receive a fault report that indicates one or more of the monitors that reported the effects of a failure mode in an aircraft system of the aircraft systems; access a fault pattern library that describes relationships between possible failure modes and patterns of those of the monitors configured to report the effects of the possible failure modes; diagnose the failure mode of the aircraft system from the one or more of the monitors that reported, and use the fault pattern library and a greedy selection algorithm; determine a maintenance action for the failure mode; and generate a maintenance message including at least the maintenance action.

Clause 20. The storage medium of Clause 19, wherein the apparatus is further caused to perform a failure mode effect analysis (FMEA) from which a fault propagation model is constructed to describe causal relationships between failure modes and failure effects, and propagation of the failure effects to monitors configured to report observable ones of the failure effects; and build the fault pattern library from the fault propagation model.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of diagnosing a failure on an aircraft that includes aircraft systems and monitors configured to report effects of failure modes of the aircraft systems, the method comprising:
receiving a fault report that indicates one or more of the monitors that reported the effects of a failure mode in an aircraft system of the aircraft systems;
accessing a fault pattern library that describes relationships between possible failure modes and patterns of those of the monitors configured to report the effects of the possible failure modes;
diagnosing the failure mode of the aircraft system from the one or more of the monitors that reported, and using the fault pattern library and a greedy selection algorithm;
determining a maintenance action for the failure mode;
generating a maintenance message including at least the maintenance action; and displaying the maintenance message including at least the maintenance action on a display utilizing an onboard computer or the aircraft.

2. The method of claim 1 further comprising:
performing a failure mode effect analysis (FMEA) from which a fault propagation model is constructed to describe causal relationships between failure modes and failure effects, and propagation of the failure effects to monitors configured to report observable ones of the failure effects, and
building the fault pattern library from the fault propagation model.

3. The method of claim 2, wherein building the fault pattern library comprises performing an analysis of the fault propagation model to build the fault pattern library that identifies the failure modes and patterns of those of the monitors that reported responsive to the failure modes.

4. The method of claim 3, wherein the analysis of the fault propagation model includes a structural-temporal analysis, and the fault pattern library further identifies any temporal sequence between multiple ones of the monitors that reported for any of the failure modes.

5. The method of claim 3, wherein the fault pattern library identifies any groups of the failure modes for which a pattern of those of the monitors that reported is the same.

6. The method of claim 5, wherein the fault pattern library further identifies any temporal sequence between multiple ones of the monitors that reported for any of the failure modes.

7. The method of claim 1, wherein upon receipt of one or more of the monitors that reported, diagnosing the failure mode using the greedy selection algorithm includes matching patterns of the one or more of the monitors that reported to patterns in the fault pattern library, the greedy selection algorithm performing the steps of:
selecting groups of patterns that minimize a number of total failed aircraft components;
selecting groups of patterns that appear earlier in a temporal sequence; and
selecting groups of patterns that have a highest calculated temporal score indicating an accuracy of the patterns of the one or more of the monitors that reported compared to the patterns of those of the monitors configured to report, and
wherein the temporal score is inversely proportional to a distance between an observed position and an expected position of the one or more of the monitors that reported an earlier failure effect in the pattern of the one or more of the monitors that reported, based on the patterns of those of the monitors configured to report.

8. The method of claim 7, wherein metrics for a root cause, a secondary symptom, and a spurious symptom are calculated for each of the groups of patterns that contain one or more of the monitors that reported, the method further comprising ranking the monitors based on the metrics including providing an initial ranking for the root cause metric from most likely to least likely.

9. The method of claim 8, wherein determining the maintenance action includes applying a contextual rules library describing operator preferences to refine a ranked sequence of maintenance actions, wherein each maintenance action is ordered according its respective probability of resolving the failure mode.

10. An apparatus for diagnosing a failure on an aircraft that includes aircraft systems and monitors configured to report effects of failure modes of the aircraft systems, the apparatus comprising:

memory configured to store computer-readable program code in a non-transitory computer-readable medium; and
processing circuitry configured to access the memory and execute the program code to cause the apparatus to at least:
receive a fault report that indicates one or more of the monitors that reported the effects of a failure mode in an aircraft system of the aircraft systems;
access a fault pattern library that describes relationships between possible failure modes and patterns of those of the monitors configured to report the effects of the possible failure modes;
diagnose the failure mode of the aircraft system from the one or more of the monitors that reported utilizing the fault pattern library and a greedy selection algorithm;
determine a maintenance action for the failure mode;
generate a maintenance message including at least the maintenance action; and
display the maintenance message including at least the maintenance action on a display.

11. The apparatus of claim 10, wherein the apparatus is further caused to:
perform a failure mode effect analysis (FMEA) from which a fault propagation model is constructed to describe causal relationships between failure modes and failure effects, and propagation of the failure effects to monitors configured to report observable ones of the failure effects; and
build the fault pattern library from the fault propagation model.

12. The apparatus of claim 11, wherein the apparatus caused to build the fault pattern library comprises the apparatus caused to perform an analysis of the fault propagation model to build the fault pattern library that identifies the failure modes and patterns of those of the monitors that reported responsive to the failure modes.

13. The apparatus of claim 12, wherein the analysis of the fault propagation model includes a structural-temporal analysis, and the fault pattern library further identifies any temporal sequence between multiple ones of the monitors that reported for any of the failure modes.

14. The apparatus of claim 12, wherein the fault pattern library identifies any groups of the failure modes for which a pattern of those of the monitors that reported is the same.

15. The apparatus of claim 14, wherein the fault pattern library further identifies any temporal sequence between multiple ones of the monitors that reported for any of the failure modes.

16. The apparatus of claim 10, wherein upon receipt of one or more of the monitors that reported, the apparatus is caused to use the greedy selection algorithm to diagnose the failure mode by being caused to match patterns of the one or more of the monitors that reported to patterns in the fault pattern library, wherein the apparatus caused to match the patterns includes being caused to:
select groups of patterns that minimize a number of total failed aircraft components;
select groups of patterns that appear earlier in a temporal sequence; and
select groups of patterns that have a highest calculated temporal score indicating an accuracy of the patterns of the one or more of the monitors that reported compared to the patterns of those of the monitors configured to report, and wherein the temporal score is inversely proportional to a distance between an observed position and an expected position of the one or more of the monitors that reported an earlier failure effect in the pattern of the one or more of the monitors that reported, based on the patterns of those of the monitors configured to report.

17. The apparatus of claim 16, wherein metrics for a root cause, a secondary symptom, and a spurious symptom are calculated for each of the groups of patterns that contain one or more of the monitors that reported, the apparatus further caused to rank the monitors based on the metrics including the apparatus caused to provide an initial ranking for the root cause metric from most likely to least likely.

18. The apparatus of claim 17, wherein the apparatus caused to determine the maintenance action includes the apparatus caused to apply a contextual rules library describing operator preferences to refine a ranked sequence of maintenance actions, wherein each maintenance action is ordered according its respective probability of resolving the failure mode.

19. A non-transitory computer-readable storage medium comprising:
  computer-readable program code for diagnosing a failure on an aircraft that includes aircraft systems and monitors configured to report effects of failure modes of the aircraft systems, in response to execution by processing circuitry and thereby causing an apparatus to at least:
    receive a fault report that indicates one or more of the monitors that reported the effects of a failure mode in an aircraft system of the aircraft systems;
    access a fault pattern library that describes relationships between possible failure modes and patterns of those of the monitors configured to report the effects of the possible failure modes;
    diagnose the failure mode of the aircraft system from the one or more of the monitors that reported utilizing the fault pattern library and a greedy selection algorithm;
    determine a maintenance action for the failure mode;
    generate a maintenance message including at least the maintenance action, and
    display the maintenance message including at least the maintenance action on a display.

20. The storage medium of claim 19, wherein the apparatus is further caused to:
  perform a failure mode effect analysis (FMEA) from which a fault propagation model is constructed to describe causal relationships between failure modes and failure effects, and propagation of the failure effects to monitors configured to report observable ones of the failure effects; and
  build the fault pattern library from the fault propagation model.

* * * * *